J. COULSON.
ELECTROLYTE.
APPLICATION FILED FEB. 19, 1917.
1,387,471. Patented Aug. 16, 1921.
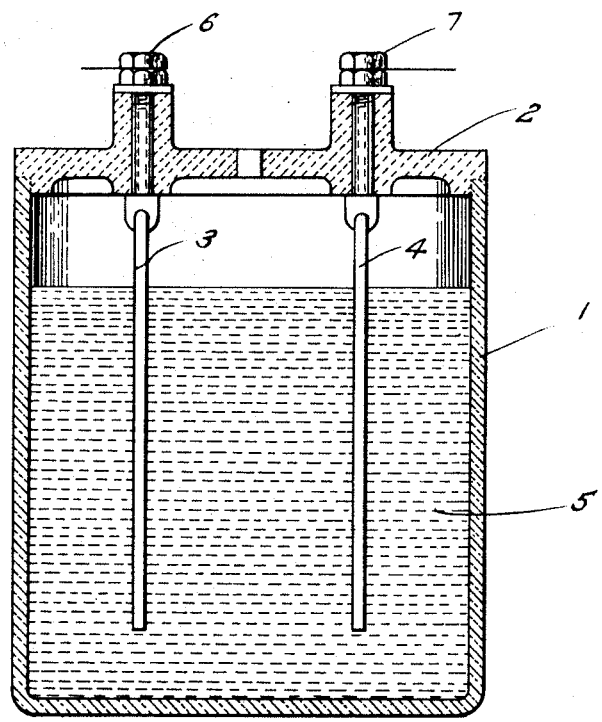
Electrolyte containing a normal ammonium tartrate
WITNESSES:
INVENTOR
John Coulson
BY
ATTORNEY

UNITED STATES PATENT OFFICE.

JOHN COULSON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTROLYTE.

1,387,471.  Specification of Letters Patent.  Patented Aug. 16, 1921.

Application filed February 19, 1917. Serial No. 149,530.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in Electrolytes, of which the following is a specification.

My invention relates to electrolytes for use in electrolytic cells, such as lightning arresters, condensers and rectifiers, and it has for its object to provide an electrolyte which shall be capable of acting upon film-forming metals, such as aluminum, magnesium and the like, to produce dielectric films of great endurance when subjected to relatively high potentials for long periods of time, and to produce active plates of high electric capacity.

Solutions of various kinds have heretofore been employed as electrolytes in cells of the above-indicated character. Such electrolytes are valuable in proportion as they enable the plates of the cells to be continuously subjected to high potentials and also in proportion to the power losses in the cells and to the capacity of the plates, these factors of operating voltage, power losses and capacity being different with different electrolytes. The electrical characteristics of the cells are also dependent upon the concentrations of the electrolytes, which should be chosen with due regard to the conditions under which the cells are to be operated.

I have discovered that electrolytes containing, in dilute aqueous solution, certain salts of tartaric acid such as ammonium tartrate, ammonium bitartrate, or mixtures of these salts, produce films upon film-forming metals which have great durability under voltages considerably in excess of the voltages which can safely be impressed upon cells in which ordinary electrolytes are employed. Tartrate solutions of high concentrations are unsuitable for the present purpose unless sterilizing agents are employed since such concentrated solutions promote the growth of fungi upon the plates of the cells, and thereby cause early failure of the films.

In the accompanying drawing forming a part hereof, the single figure is a vertical sectional view of an electrolytic cell embodying my invention.

The cell body 1 is provided with a cover 2 secured thereto in any suitable manner and carrying electrodes 3 and 4 immersed in electrolyte 5 usually normal ammonium tartrate. Suitable terminals 6 and 7 conduct current to the electrodes.

A 1% solution of normal ammonium tartrate gives excellent results, and condenser plates of aluminum may be maintained continuously in this electrolyte under alternating-current potentials as high as 425 volts without appreciable deterioration, and with an initial power-factor loss of 5% to 6%, rising to a maximum of about 10% during continuous operation. The instantaneous break-down voltage is considerably higher, ranging between 550 and 600 volts, and the capacity of the plates is about $\frac{1}{15}$ microfarad per square centimeter when the plates are given a preliminary acid treatment according to the process described and claimed in my copending application for Letters Patent, Serial No. 54,590, filed October 7, 1915. The ammonium tartrate electrolyte may be prepared either by dissolving the salt in water or by neutralizing a solution of tartaric acid by means of ammonia.

Ammonium bitartrate is somewhat preferable to normal ammonium tartrate for cells that are to be operated at high voltages, such as 300 to 400 volts.

Electrolytic condensers and other cells in which these tartrate electrolytes are employed have also the advantage of a low temperature coefficient, that is to say, a low rate of increase in power-factor loss with increase in temperature.

While the electrolytes which I have specifically described possess the good operating characteristics mentioned above, it is to be understood that my invention is not restricted to the use of these specific salts or of the particular concentrations mentioned. The advantages of high endurance with low power losses is characteristic, to a greater or less degree, of soluble salts of tartaric acid with ammonium and with weak bases, and I desire, therefore, that no limitations, as to materials, proportions or other conditions, shall be imposed upon my invention except such as are indicated in the appended claims.

I claim as my invention:

1. An electrolyte for electrolytic condensers, lightning arresters, rectifiers and the like comprising an aqueous solution containing approximately 1% of normal ammonium tartrate.

2. An electrolyte for electrolytic condensers, lightning arresters, rectifiers and the like solely comprising approximately 1% aqueous solution of a normal salt of ammonium and tartaric acid.

In testimony whereof, I have hereunto subscribed my name this 31st day of January, 1917.

JOHN COULSON.